(No Model.) 2 Sheets—Sheet 1.
W. F. OLIN.
GRAIN BINDING HARVESTER.
No. 434,521. Patented Aug. 19, 1890.
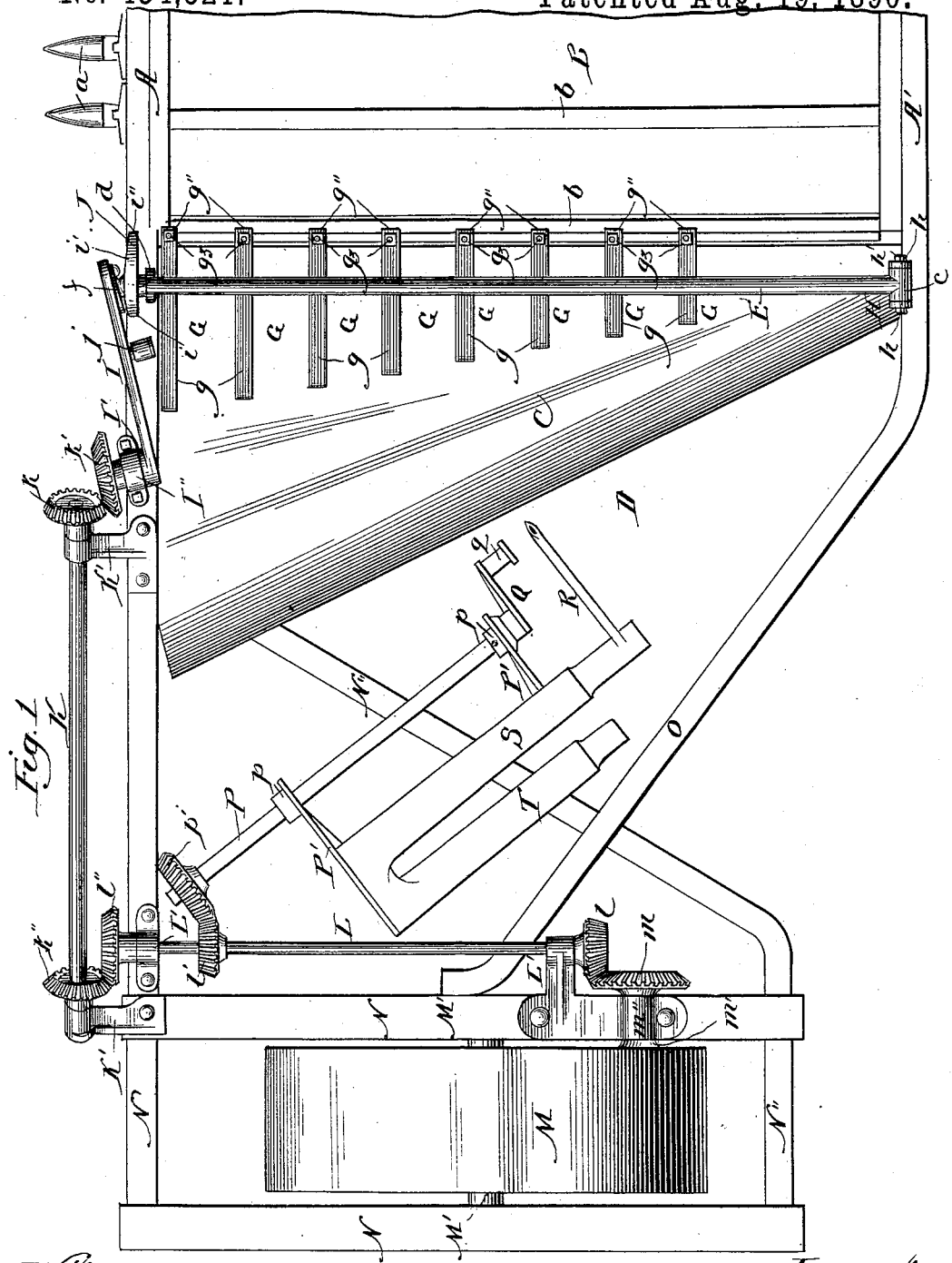
Witnesses:
O. W. Bond
H. B. Hallock
Inventor:
William F. Olin (No Model.) 2 Sheets—Sheet 2.
W. F. OLIN.
GRAIN BINDING HARVESTER.
No. 434,521. Patented Aug. 19, 1890.
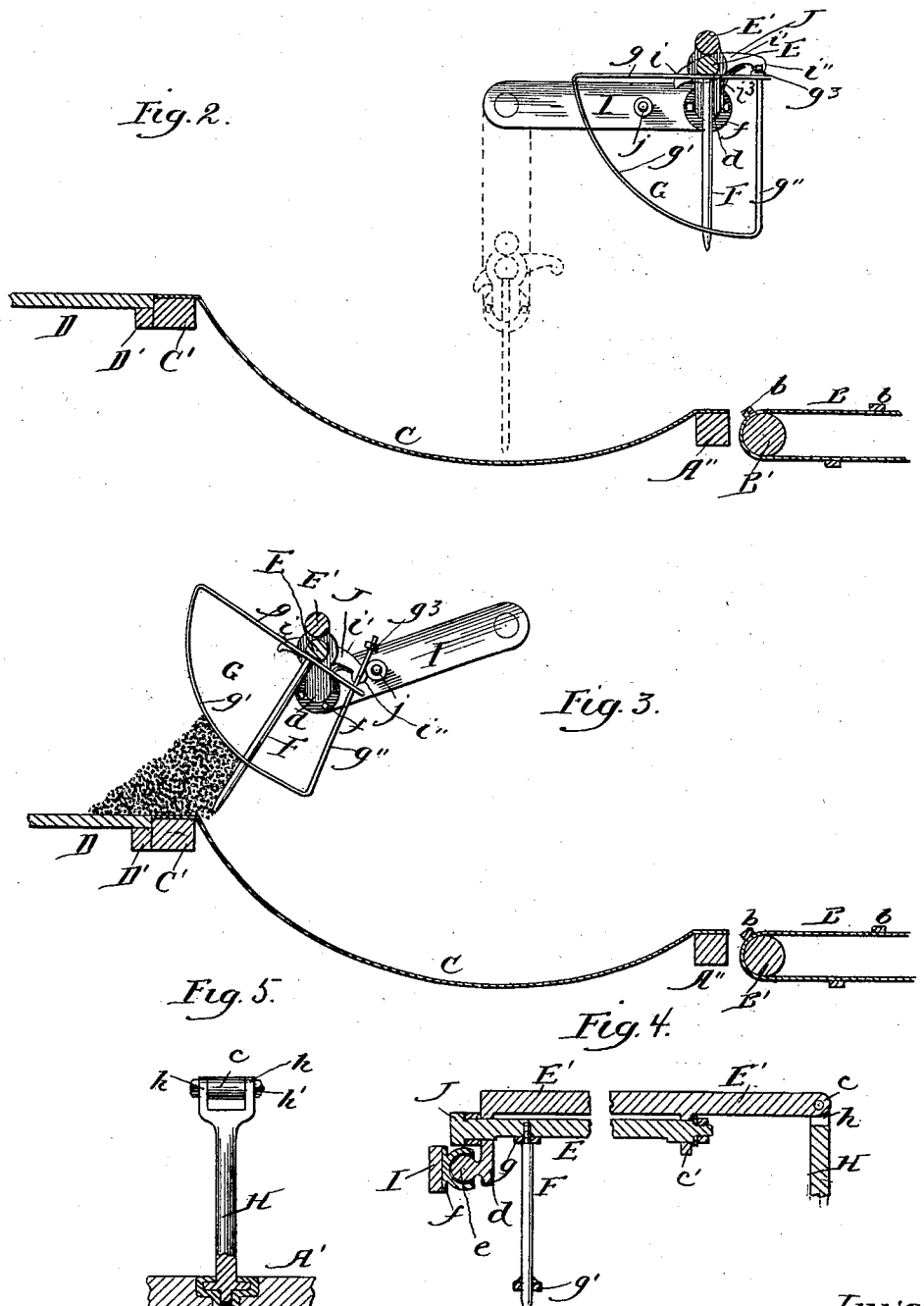
Witnesses:
O. W. Bond.
H. B. Hallock.
Inventor:
William F. Olin

UNITED STATES PATENT OFFICE.

WILLIAM F. OLIN, OF CHICAGO, ILLINOIS.

GRAIN-BINDING HARVESTER.

SPECIFICATION forming part of Letters Patent No. 434,521, dated August 19, 1890.

Application filed December 7, 1889. Serial No. 332,985. (No model.)

*To all whom it may concern:*

Be it known that I, WILLIAM F. OLIN, a citizen of the United States, residing at Chicago, in the county of Cook and State of Illinois, have invented a certain new and useful Improvement in Grain-Binding Harvesters; and I do hereby declare that the following is a full, clear, and exact description of the invention, which will enable others skilled in the art to which it pertains to make and use the same, reference being had to the accompanying drawings, forming a part hereof, in which—

Figure 1 is a top or plan view with the carrier-platform broken off; Fig. 2, an end elevation of the sweep, showing the delivery end of the platform-carrier, the concave, and the binding-table in section, the sweep being raised to enter the grain and carry it forward; Fig. 3, a similar view to Fig. 2, the sweep being in position and delivering the grain onto the binding-table; Fig. 4, a detail in section showing the connection of the sweep with its operating-crank; Fig. 5, an end elevation showing the support for the rear end of the sweep.

This invention is primarily designed for delivering the grain cut by a harvesting-machine to a self-binder, by which the grain is bound into bundles on the machine and delivered onto the ground or into a receptacle; but the invention can be applied to and used with other classes of harvesters where it is desired to have the cut grain delivered at the rear of the main drive-wheel, and it is especially applicable to harvesting-machines termed "low-down."

The object of the invention is to take the cut grain from the carrier-platform and deliver it to a binding-table in a compact and straight condition, suitable for binding purposes, and this object is accomplished by means of a sweep standing diagonal to the delivery-line of the platform when delivering the grain to the binding-table and entering the grain at the delivery end of the carrier-platform parallel with the end of the platform, or nearly so, and from the entering-point describing a circular orbit of a cone shape and moving the grain onto the binding-table, by which the butts of the grain will be advanced faster than the heads, turning the grain endwise in its passage from the carrier-platform to the binding-table; and the invention consists of the several parts and combinations of parts hereinafter described, and pointed out in the claims for attaining the objects sought.

In the drawings, A represents the front sill of a harvester, having guards $a$, as usual, for the sickle, and A' the rear sill connected with the front sill by cross-sills A'', as usual, and the machine is to be provided with the divider and other appliances, as usual; B, the carrier-platform, made of canvas, and having carrying-strips $b$, and running over rollers, in the usual manner, the delivery-end roller B' only being shown.

C is a concave attached at its receiving side to the cross-piece A'' of the frame, to lie adjacent to the delivery end of the carrier B, and attached at its delivery side to a cross-piece C', which lies in a higher plane than the cross-piece A'', as shown in Figs. 2 and 3, and the concave C is formed to have its receiving side straight and its delivery side on an incline, so that its front end is wider than its rear end, as shown in Fig. 1.

D represents the binding-table, located adjacent to and in a plane with the delivery side of the concave C and supported upon suitable cross-pieces, one of which D' is shown in Figs. 2 and 3 adjacent to the cross-piece C'; E, the sweep-shaft of a length to extend across the machine front and rear, as shown in Fig. 1; F, the sweep-teeth, screwed or otherwise secured in the shaft or bar E, and of a length to have their points sweep over the surface of the concave from the receiving side to the delivery side of such concave.

G represents compression guards or fingers, each formed of a horizontal portion $g$, a curved portion $g'$, and a vertical portion $g''$. Each guard or finger can be formed of a single piece, bent into the shape shown, and each guard is attached to the shaft or bar E by means of its tooth F, or by bolts or otherwise, passing through the horizontal portion $g$, and the vertical portion $g''$ of each guard or finger at its upper end is round in cross-section and passes through a slot $g^4$ in the end of the horizontal part $g$, and the projecting end of the vertical part $g''$ is screw-threaded to receive a nut $g^3$, by which the spring of the guard or finger is adjusted, and the part $g''$ is held against withdrawal from the part $g$. The guards or fingers G are graded from the front end of the shaft or bar E to the rear end, as shown in Fig. 1, the first or front guard being the longest and the guards gradually decreasing in length toward the rear and the teeth F pass through the curved part $g'$ of its guard or are located between the guards or fingers G, so that the guards or fingers furnish a means for clearing the teeth F as well as compressing and holding the grain in its travel over the concave C.

H is a post extending up from the rear sill A', and pivotally mounted at its lower end in said sill by having its end enter a step-box, as shown in Fig. 5. The upper end of the post H has ears $h$, between which, on a bolt or pin, is pivoted a sleeve $c$, secured to the rear end of a bar E', and the front end of this bar E' has secured thereto a head or plate $d$. The bar E' is located above the sweep-shaft E and the shaft E is mounted at its front end in the head $d$, and at its rear end in a support $c'$ depending from the bar E', so that the shaft E is free to turn in its supports $d$ and $c'$.

I is a crank having at its outer end a socket $f$ to receive a ball $e$ on the head $d$, by which the crank I is connected with the shaft E and bar E' to cause its rotation to revolve the shaft and bar, and in such rotation the post H will turn on its pivot and the sleeve $c$ will turn on its pivot to allow the bar E' to assume the various positions from the rotation of the crank I.

J is a trip and release finger firmly secured to the end of the shaft E which projects through the head $d$. This finger J has an end $i$, the curved face $i'$, and a tail end $i''$, and is returned to its normal position by a spring $i^3$, attached to the head $d$, for its free end to engage the under side of the finger J. The crank I has a pin or roller $j$ projecting from its inner face at a point to pass the head $i$ of the finger J and pass over the face $i'$ and engage the tail $i''$ to depress the finger J and rock the shaft E, so that by the engagement of the roller or pin $j$ with the face $i'$ of the finger J the shaft E will be turned to cause the lower end of the teeth F to describe a circle corresponding to the circle of the concave C in the passage of the teeth F over the concave C to carry the grain from the platform B and deliver it onto the binding-table, and when the roller or pin $j$ passes the tail $i''$ of the finger J the spring will act to return the finger J and rock the shaft E for the finger or teeth F to stand vertical, as shown in Fig. 2, to enter the grain in a straight line. The compression-guards G are also turned by the action of the finger J, and the position of the teeth F and guards G in delivering the grain is shown in Fig. 3.

K is a shaft supported in suitable bearings K' on the front frame of the machine, so as to stand inclined. A bevel-gear $k$ is secured to the end of the shaft K to mesh with a bevel-gear $k'$, secured to the end of the crank-shaft I', which shaft is supported in a suitable bearing I'' on the front frame of the machine.

L is a shaft supported in suitable bearings L' on the frame of the machine, and having secured to its front end a bevel-gear $l''$ to mesh with a bevel-gear $k''$ on the shaft K.

M is the main wheel of the machine, having an axle M' suitably supported in bearings on the frame-work. A bevel-gear $m$ is driven from the wheel M by a shaft $m'$ mounted in a bearing $m''$, and this bevel-gear $m$ meshes with a bevel-gear $l$ to drive the shaft L.

N represents the side sills of the frame for the driving-wheel M, and N' the front sill of the binder-frame, which may be a continuation of the front sill A or be a separate sill. As shown, a diagonal brace-bar N'' extends from the front end of the cross-sill C' to the rear end of the sills N, and is bolted or otherwise firmly secured to the sills C' and N.

O is a diagonal brace extending from the rear sill A' to the inner sill N and bolted or otherwise firmly secured to such sill; P, a shaft supported in bars P' and held against end movement by collars $p$, and having secured to its front end a bevel-gear $p'$ to mesh with the bevel-gear $l'$ of the shaft L for driving the shaft P from the shaft L; Q, a crank secured to the rear end of the shaft P, and having on its outer end a pin $q$ for a packing-arm, as shown; R, the binding-arm; S, a sleeve in which is mounted the shaft carrying the binding-arm R; T, a sleeve in which is mounted the shaft operating the compressor-arm. (Not shown.)

The forward travel of the machine causes the wheel M to rotate the bevel-gear $m$, which rotates the bevel-gear $l$ and drives the shaft L to rotate the bevel-gear $l''$, which rotates the bevel-gear $k''$ and drives the shaft K to rotate the bevel-gear $k$, which rotates the bevel-gear $k'$, and through the shaft I'' revolves the crank I, and such revolution of the crank I carries around the bar E' and the shaft E, causing the teeth F and guards G to sweep over the concave C.

The operation of delivering the grain from the carrier-platform to the binding-table is as follows: The grain as it is cut falls upon the carrier-platform B and is carried thereby to the delivery end of such platform, to pass onto the concave C, and the grain will pass onto the concave C as the teeth F and guards G pass from the receiving end to the delivery end of the concave, following after the teeth and guards, and the concave, the teeth, and the guards form a breast for the grain delivered onto the concave, against which the grain will be straightened, as delivered. The sweep, as a whole, is carried around in a conical orbit by the action of the crank I swinging from a pivotal point formed by the post H and sleeve $c$. The first quarter-turn of the crank I, in descending, will carry down the shaft E and bar E', with the teeth standing vertical, as shown in Fig. 2, for the teeth to pass back of the grain which has been delivered on the concave C, and the continued descent of the crank to its lowest point, and its ascent from that point will carry the teeth F over the concave, with the grain caught by the teeth, and deliver the grain so caught onto the binding-table, as shown by the dotted lines in Fig. 2 and the full lines in Fig. 3, and during such carrying of the grain over the concave C the compressing guards or fingers G will press on the grain and hold it compactly. The teeth F and guards G in sweeping over the concave will be gradually turned by the action of the finger J and pin or roller $j$, so that the path described by the ends of the fingers F and the guards G will coincide with the circle of the concave, and the finger J and roller or pin $j$ will coact from the time the teeth F enter the grain until the grain is delivered onto the table D, as shown in Fig. 3, at which time the roller or pin $j$ passes around the tail $i''$ of the fingers J, releasing the teeth F and permitting the easy withdrawal of the teeth from the grain in the continued ascent of the crank I, and allowing the teeth F to fall back and be clear of the grain, so as not to toss and throw the grain in delivering it, but be withdrawn in a straight line from back of the grain. The rotation of the sweep as a whole, in connection with the action of the fingers J, gives the teeth F a direct vertical line in entering and withdrawing from the grain, and pitch the teeth at the proper incline to pass over the concave and carry the grain.

The movement of the sweep as a whole is in a less circle at the rear end than at the front, owing to the stationary pivotal point for the rear end of the bar E', and this movement gives but little action on the grain at the head ends and a greater action on the grain at the butt ends, the result being that the butt ends travel faster than the head ends, which turns the grain sidewise, with the heads toward the carrier-platform when delivered on the binding-table, and so that when bound and discharged the bound bundle will drop at the rear of the machine and inside of the track of the main wheel, and the grain in being delivered onto the binding-table will be compacted by the action of the compressor-fingers G and the resistance of the concave, by which means the grain is delivered in proper shape for the action of the packer-fingers to form it into a bundle. The compressing-fingers G yield to accommodate themselves to the amount of grain being carried forward, such yield being permitted by the part $g''$ sliding up in the slot $g^3$ of the part $g$, and the spring of the guard will return it to normal position after the guard leaves the grain on the binding-table. The sweep as a whole makes one operation to each revolution of the crank I, and while the grain in front of the teeth F is being carried over the concave C the grain for the next operation is being delivered onto the concave from the carrier-platform back of the teeth F and the guards G, in position for the teeth on the next descent to enter the grain and separate that on the concave from that on the carrier-platform to carry the separated portion forward to the binding-table, and such operation is continued until all the grain has been cut and bound.

The rotation of the sweep, in connection with the turning or feathering of the teeth, enters the teeth F into the grain on the receiving end of the concave in a straight vertical line, and withdraws the teeth at the delivery end of the concave in the same manner, thereby producing a clean separation of the grain for the bundle and a delivery thereof onto the binding-table, and this movement of the sweep in a conical orbit raises the teeth clear of the grain in the backward movement of the teeth to again enter the grain, so that in the entire action there is no interference between the teeth and the grain.

A crank is shown for moving the sweep, but in place thereof a wheel or disk could be used, and in place of a ball-and-socket-joint connection between the crank and the sweep other forms of universal-joint connections, or connections allowing of free movement, could be used, and instead of having a post H pivoted as a whole such post could have a pivoted head carrying the bar E'.

The shaft E is loosely mounted in the hanger or support $c'$ and the head or arm $d$, and the teeth F naturally hang vertically downward and would strike the bottom of the concave and be turned back so as not to carry the grain if some means were not provided for turning them forward and holding them rigid while traveling over the concave, and these means are found in the finger J and the roller $j$. The finger J is firmly attached to the projecting end of the shaft E, and is set for the curved acting face $i'$ to be at the upper side of the bar or shaft E, with the teeth F on the under side of such bar or shaft E, as shown in Figs. 2 and 3, and always remains in this relation to the teeth.

The acting face $i'$ of the finger J, at a point in vertical line with the center of the shaft E, is at the same distance from the ball $e$ as is the periphery of the roller $j$, while its head or point $i$ is within the radius of the circle described by the roller $j$ around the ball $e$ by the rotation of the crank I, and the tail $i''$ of this finger J is outside of the radius of the circle described by the roller $j$ around the ball $e$. The crank I revolves on its journal, the shaft or pin I' causing both the ball $e$ and the roller $j$ to describe circles around the shaft or pin I' as a center, the circle of the ball $e$ to be the largest. The ball $e$ remains with its upper side always up, so that the ball $e$ and the shaft E' are at all times in the same vertical straight line, while the socket $f$ turns around the ball $e$ as a center, and the roller $j$ describes a circle around the ball $e$ as a center. The finger J is over the ball $e$, and does not change its relation to the ball $e$ in the rotation of the crank I, while the roller *j* does, and the result is that the roller *j* must travel over the acting face of the finger J from its head to its tail, and the passage of the roller *j* over the tail end of the acting face *i'* depresses the tail end of the finger J, gradually raising the points of the teeth for the travel over the concave, and when the roller *j* passes the end of the finger J the finger is released, and the teeth drop by gravity to be in a vertical position. The teeth are locked and held by the finger J and roller *j* from their entrance into the grain at the receiving side of the concave until the grain has been delivered to the binding-table, and on the return movement the teeth are free, so as to ride over the grain in the concave, and this locking and releasing of the teeth will occur at each revolution of the crank I.

What I claim as new, and desire to secure by Letters Patent, is—

1. The combination, in a harvesting-machine, of a concave located between the carrier-platform and the delivery-table, with a sweep having a stationary pivot at its rear end and revolving in a conical orbit above the concave for sweeping the grain over the concave and delivering the grain from the carrier-platform sidewise onto the receiving-table with the heads toward the carrier-platform, substantially as specified.

2. The combination, in a harvesting-machine, of a concave located between a carrier-platform and a receiving-table, with a shaft carrying teeth and operated by a bar having a stationary pivot at its rear end and a pivot at its front end traveling in a circular orbit for moving the bar in a conical orbit, substantially as and for the purposes specified.

3. The combination, in a harvesting-machine, of a concave located between a carrier-platform and a receiving-table, with a shaft carrying a series of teeth and a series of compression-fingers, and operated by a bar moving in a conical orbit, substantially as and for the purpose specified.

4. The combination of a concave having a straight receiving side and a diagonal delivery side, with a sweep having a stationary pivot at its rear end and a pivot traveling in a circular orbit at its front end and moving in a conical orbit for operating the teeth of the sweep to deliver grain over the concave from a carrier-platform to the receiving-table in a harvesting-machine, substantially as and for the purposes specified.

5. The carrier-platform B, concave C, and receiving-table D, in combination with the shaft E, teeth F, and bar E', revolving in a conical orbit and having a stationary pivot at its rear end and a pivot traveling in a circular orbit at its front end, substantially as and for the purposes specified.

6. The carrier-platform B, concave C, wider at its front end than at its rear end and having a straight receiving and a diagonal delivery side, and receiving-table D, in combination with the shaft E, teeth F, compressing-fingers G, and bar E', revolving in a conical orbit, substantially as and for the purposes specified.

7. The carrier-platform B, concave C, wider at its front end than at its rear end and having a straight receiving and a diagonal delivery side, and receiving-table D, in combination with the shaft E, teeth F, compressing-fingers G, bar E', revolving in a conical orbit, and a trip for the shaft E, substantially as and for the purposes specified.

8. The shaft E, teeth F, and compressing-fingers G, in combination with the bar E' and tripping-finger J, substantially as and for the purposes specified.

9. The shaft E and teeth F, in combination with the yielding compression-fingers G, substantially as and for the purposes specified.

10. The shaft E, teeth F, and bar E', in combination with the crank I, pin or roller *j*, and tripping-finger J, substantially as and for the purpose specified.

11. The shaft E, teeth F, compressing-fingers G, and bar E', in combination with the crank I, pin or roller *j*, and tripping-fingers J, substantially as and for the purpose specified.

12. The shaft E, teeth F, and bar E', in combination with the locking-post H, crank I, and tripping-finger J, substantially as and for the purposes specified.

13. The shaft E, teeth F, compressing-fingers G, and bar E', in combination with the rocking post H, crank I, and tripping-finger J, substantially as and for the purposes specified.

14. The carrier-platform B, concave C, and receiving-table D, in combination with the shaft E, teeth F, bar E', rocking post H, crank I, and tripping-finger J, substantially as and for the purposes specified.

15. The carrier-platform B, concave C, and receiving-table D, in combination with the shaft E, teeth F, compressing-fingers G, rocking post H, crank I, and tripping-finger J, substantially as and for the purposes specified.

WILLIAM F. OLIN.

Witnesses:
O. W. BOND,
H. B. HALLOCK.